6 Sheets—Sheet 1.

S. D. LOCKE.

Machine for Cutting and Binding Grain.

No. 8,862. Reissued Aug. 19, 1879.

Attest:
H. L. Prairie
Saul Kelly.

Inventor:
Sylvanus D. Locke
By Pancoast & Pancoast
Atty's

S. D. LOCKE.

Machine for Cutting and Binding Grain.

No. 8,862. Reissued Aug. 19, 1879.

Inventor

Sylvanus D. Locke

By Parkinson & Parkinson

Atty's

Attest:

H. L. Perrin,

Dan'l Kelly

S. D. LOCKE.

Machine for Cutting and Binding Grain.

No. 8,862. Reissued Aug. 19, 1879.

Attest:
H. D. Perrine
Daniel Kelly.

Inventor.
Sylvanus D. Locke
By. Munson & Munson
Atty's.

S. D. LOCKE.

Machine for Cutting and Binding Grain.

No. 8,862. Reissued Aug. 19, 1879.

Attest:
H. L. Arnie
Dan'l Kelly

Inventor.
Sylvanus D. Locke
By Parkinson & Parkinson
Atty's

S. D. LOCKE.

Machine for Cutting and Binding Grain.

No. 8,862. Reissued Aug. 19, 1879.

Attest:
H. L. Perrine
Daniel Kelly

Inventor:
Sylvanus D. Locke
By. Parkinson and Parkinson
Atty's

S. D. LOCKE.

Machine for Cutting and Binding Grain.

No. 8,862. Reissued Aug. 19, 1879.

Attest:
H. L. Perrine
Daniel Kelly

Inventor:
Sylvanus D. Locke
By. Pennie & Pennie
Atty's

UNITED STATES PATENT OFFICE.

SYLVANUS D. LOCKE, OF HOOSICK FALLS, NEW YORK.

IMPROVEMENT IN MACHINES FOR CUTTING AND BINDING GRAIN.

Specification forming part of Letters Patent No. 106,945, dated August 30, 1870; Reissue No. 8,862, dated August 19, 1879; application filed July 2, 1879.

*To all whom it may concern:*

Be it known that I, SYLVANUS D. LOCKE, formerly of Janesville, Rock county, Wisconsin, but now of Hoosick Falls, in the county of Rensselaer and State of New York, have invented certain new and useful Improvements in Harvesting-Machines, of which the following is a specification.

Figure 1:
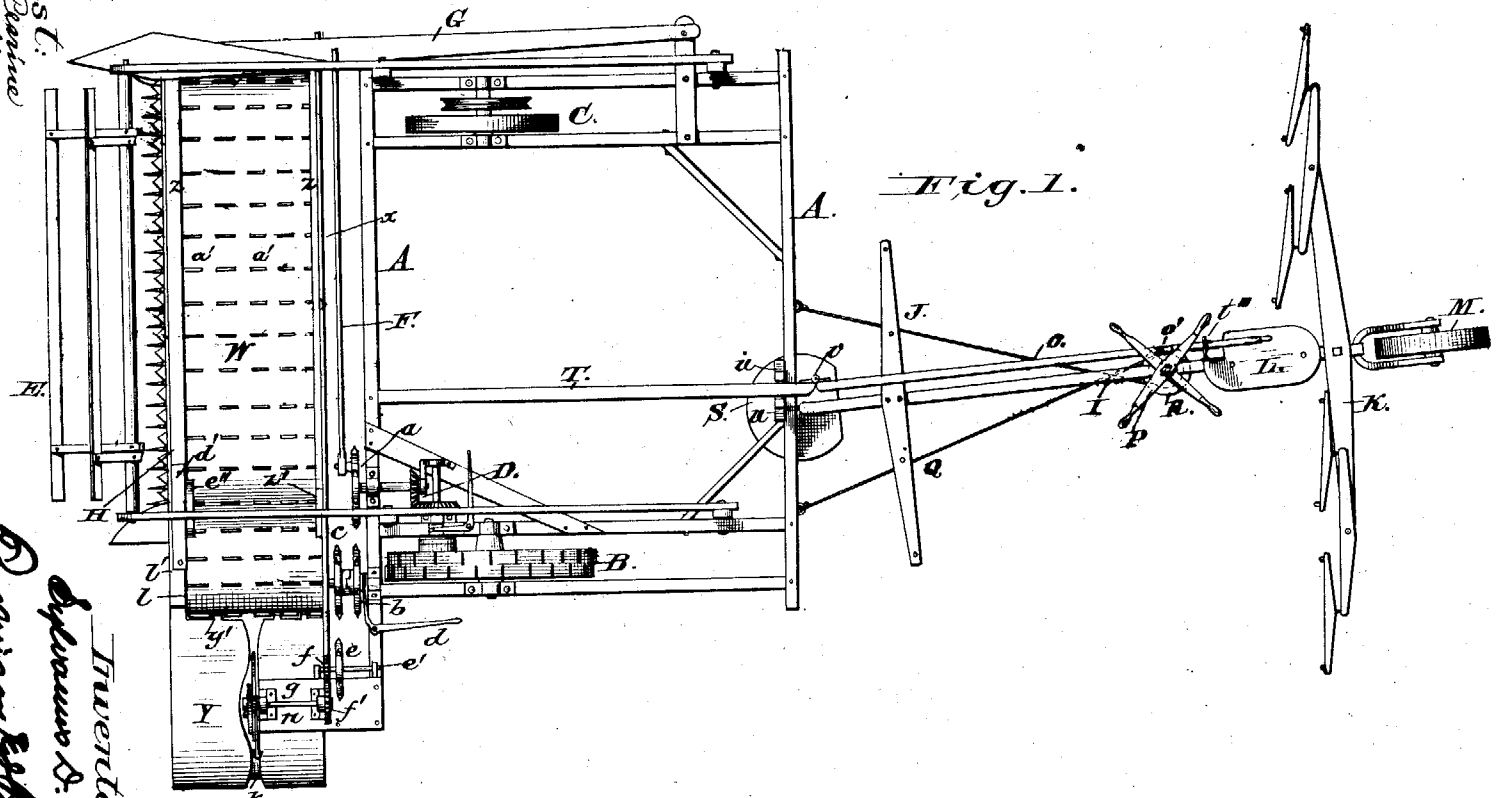
Figure 2:
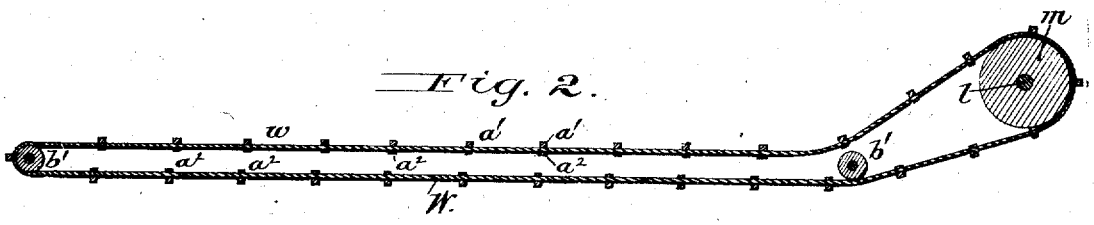
Figure 3:
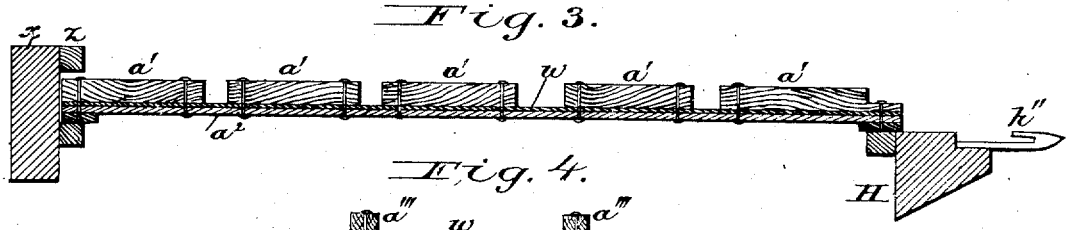
Figure 4:
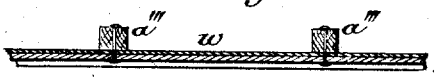
Figure 5:
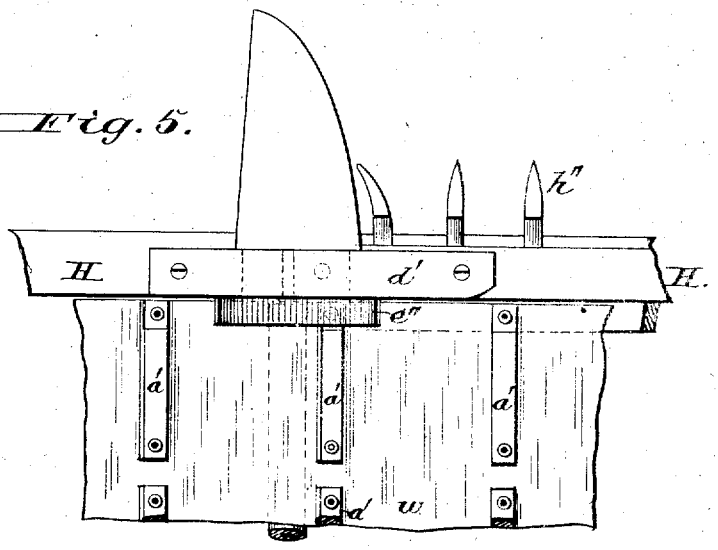
Figure 6:
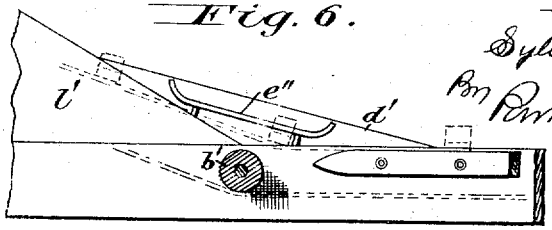
Figure 7:
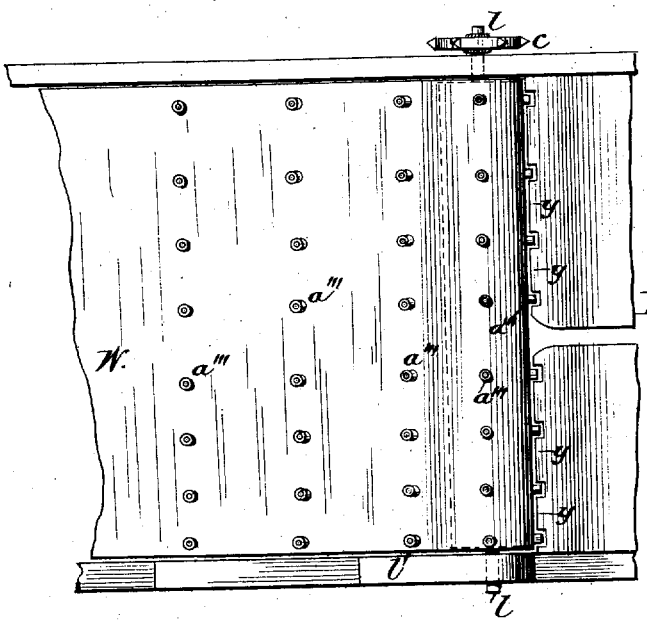
Figure 8:
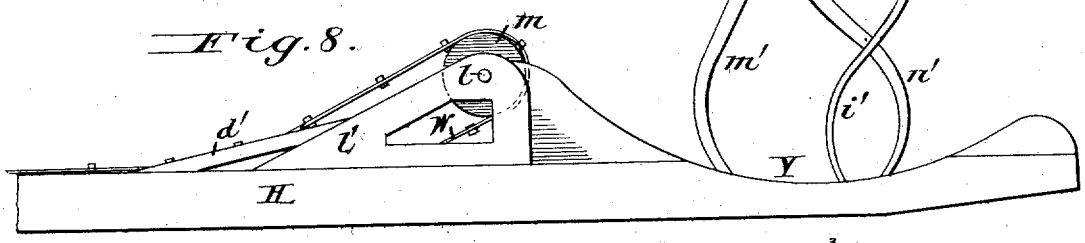
Figure 14:
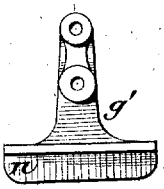
Figure 16:
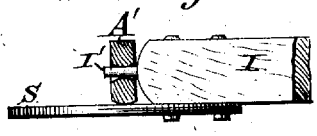
Figure 17:
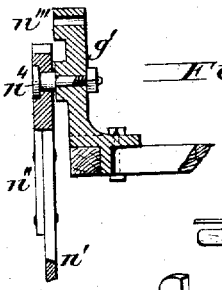
Figure 19:
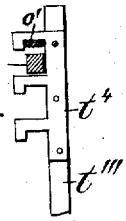
Figure 20:
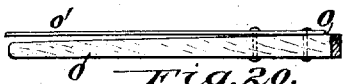
Figure 15:
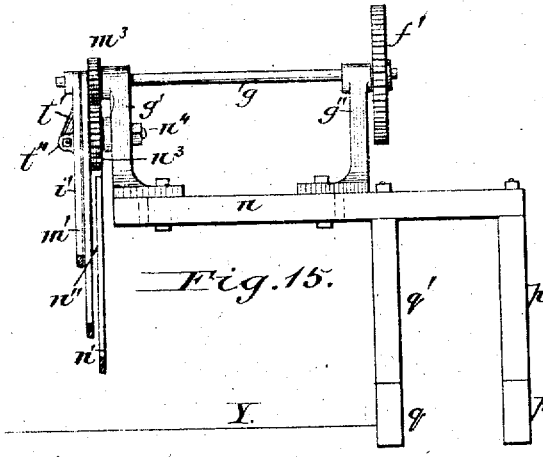
Figure 18:
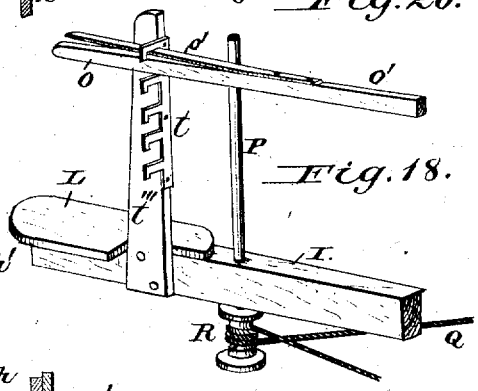
Figure 21:
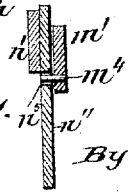
Figure 22:
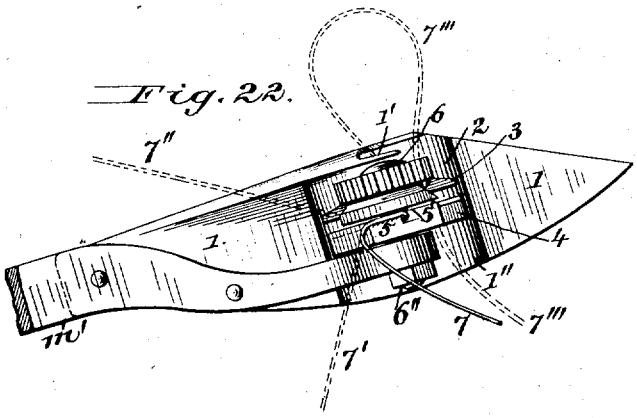
Figure 25:
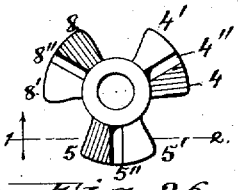
Figure 26:
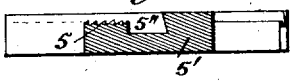
Figure 27:
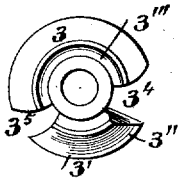
Figure 28:
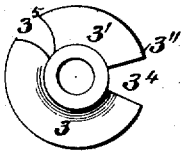
Figure 23:
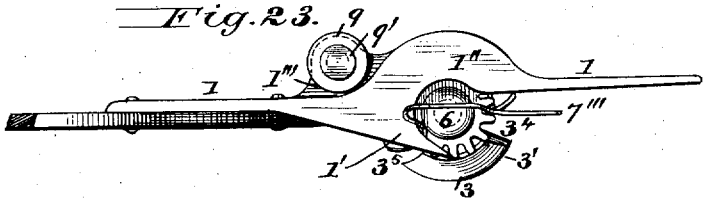
Figure 29:
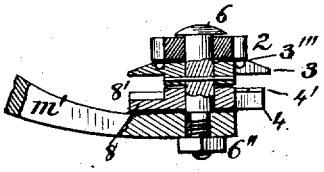
Figure 24:
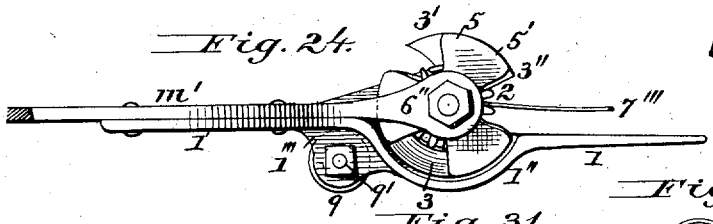
Figure 30:
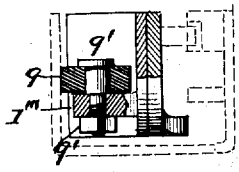
Figure 31:
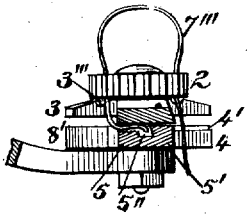
Figure 32:
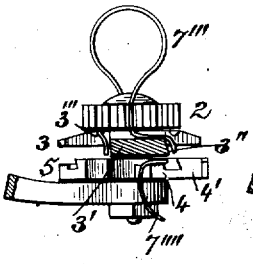
Figure 33:
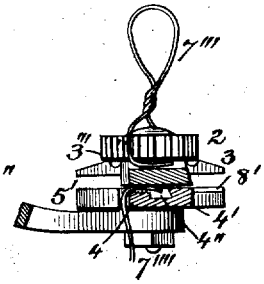
Figure 34:
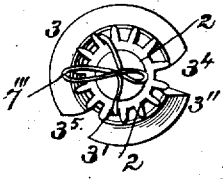
Figure 35:
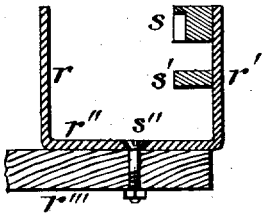
Figure 36:
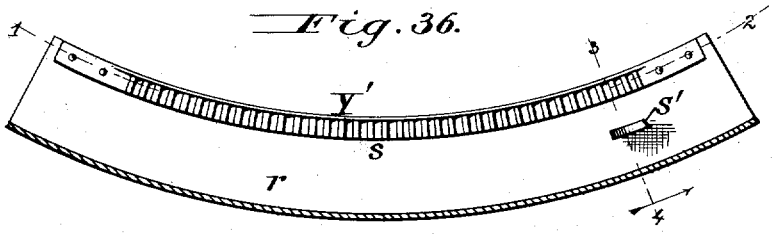
Figure 37:
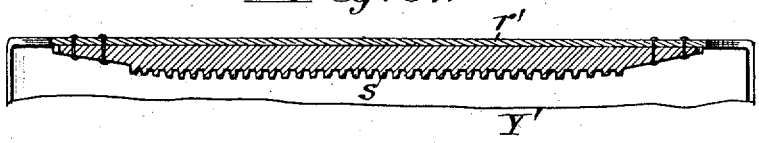
Figure 38:
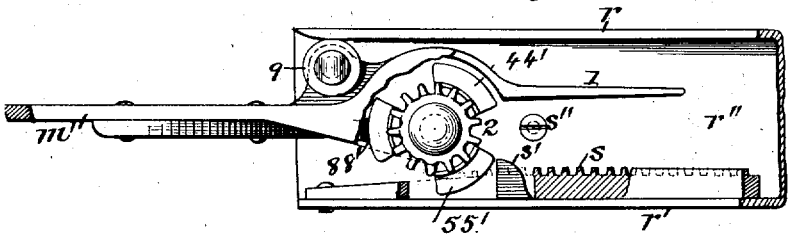
Figure 39:
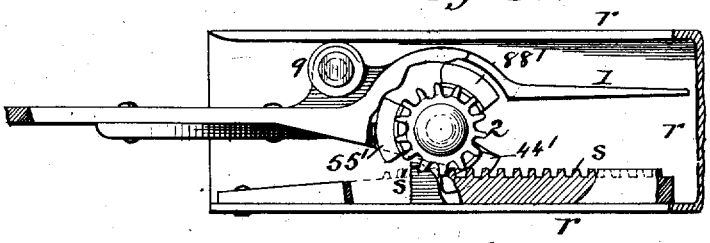
Figure 40:
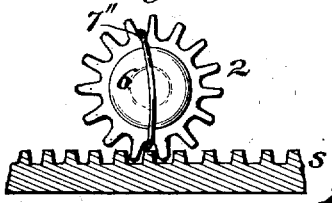

In the accompanying drawings, Figure 1 is a top or plan view of my machine. Fig. 2 is a longitudinal vertical section of the apron and its drums. Fig. 3 is a transverse vertical section of the apron through the cross-slats. Fig. 4 is a transverse vertical section, showing a different construction of the apron. Fig. 5 is a top view of a portion of the apron, showing the angle-block and spring. Fig. 6 is a side view, from the direction of the apron, of the angle-block and spring, with a portion of the finger-bar and section of the roll at the angle of the apron. Fig. 7 is a top view of the apron shown in Fig. 4 and of the binding-platform or grain-receptacle. Fig. 8 is a front view of the binding mechanism and the end of the apron and finger-bar adjacent thereto. Figs. 9, 10, 11, 12, and 13 are front views of the binding mechanism, showing the different positions of the compressing and binding arms during the operation of binding. Fig. 14 is a front view of the bracket or support upon which the compressing and binding arms take bearing. Fig. 15 is a side view of the compressing and binding arms and their support. Fig. 16 is a transverse vertical section of the rear girt of the harvester-frame, showing how the pole is joined thereto. Fig. 17 is a longitudinal section through the stud-bolt upon which the outer compressing-arm vibrates, showing the manner in which said arm is supported. Fig. 18 is a perspective, showing how the guiding-cable is attached to the lower portion of the capstan and how the lifting-lever is held. Fig. 19 is a transverse section of the lifting-lever just forward of its holding mechanism. Fig. 20 is a longitudinal vertical section of the handle of the lifting-lever. Fig. 21 is a horizontal section through the stud-pin on the binder-arm and the cam on the opposing compressing-arm, as represented in Fig. 10. Fig. 22 is a front view of the binding-head. Fig. 23 is a top view of the same. Fig. 24 is an under view of the same. Fig. 25 is a top view of the rotating part of the wire-holder and wire-cutter. Fig. 26 is a transverse section of an arm of the same. Fig. 27 is a top view of the fixed part of the wire-holder and wire-cutter. Fig. 28 is an under view of the same. Fig. 29 is a longitudinal vertical section of the binding-head, with its shield removed, as shown in Fig. 22. Fig. 30 is a section longitudinally through the stud-bolt of the anti-friction roll, shown in Figs. 23 and 24, upon the binding head. Figs. 31, 32, and 33 are vertical sections of the wire holder and cutter, showing the positions of the binding-wire during the process of binding. Fig. 34 is a top view of parts as shown in Fig. 33. Fig. 35 is a transverse vertical section of the rack-box, shown in Fig. 10. Fig. 36 is a longitudinal vertical section of the same. Fig. 37 is a longitudinal section of the rack. Figs. 38 and 39 are top views of the rack-box, with the binding-head in the act of passing through it, showing how the twisting-pinion and wire holder and cutter are operated; and Fig. 40 is a top view of the twisting-pinion and a portion of the rack.

My invention is shown as applied to that class of harvesting-machines constructed after the manner of the machine known as the "header;" and it consists, first, in an improved mode of joining the pole to the main frame, whereby a horizontal and vertical adjustment of the parts is attained; second, in the construction and arrangement of the endless delivering rake or apron in connection with the binding mechanism; third, in the construction and combination of devices for automatically binding grain.

To enable others skilled in the art to make and use my invention, I will proceed to describe its construction and operation.

I make my machine of the general form of the ordinary header, providing it with the ordinary parts thereof, as a frame, A A, drive-wheel B, grain-wheel C, reel E, driving-gear D, pitman F, pitman-lever G, finger-bar H, pole I, whiffletree K, driver's stand L, lifting-lever O, and rear wheel, M. The rear-wheel M, however, is allowed to turn only with the pole I, to which it is rigidly attached, as shown in Fig. 1.

The lifting-lever, as used on the header, is perfectly rigid with reference to the main frame, both horizontally and vertically, while the pole is allowed a relative vertical movement for the purpose of raising and lowering the finger-bar with its cutter, and, together with the lifting-lever, is controlled as to its horizontal angle with the main frame, in order to steer the machine, and to enable it to be easily and quickly turned around. To this end I join the pole I and lifting-lever O to the frame A A, as shown in Figs. 1 and 16, so as to allow the driver, standing on the footboard L, to change at pleasure their inclination laterally to the frame.

One mode of jointing laterally the lifting-lever is shown at $v$, Fig. 1, and consists in the simple interposition of a metallic hinge between the lever O and the oblique girt T, which forms a continuation of said lever to the front girt of the main frame.

A mode of joining the pole is shown in Fig. 16, and consists in a simple pin, I′, that plays in a conical slot or aperture, A′, in the rear girt of the frame.

Around the lower portion, R, Figs. 1 and 18, of the capstan P, that takes bearing in the pole I, is the cable Q, that has its ends firmly attached to staples or hooks driven in the rear girt, A, on either side of the pole.

Secured to the pole is an upright piece or standard, $t'''$, Figs. 1 and 18, that has attached thereto a cast-iron holder, $t^4$, for receiving and holding the end of the lifting-lever O. This end or handle is provided with a spring, $o'$, Figs. 1, 18, 19, and 20, that is used to retain the lever in the holder $t^4$, as therein shown.

In Fig. 1, $u$ $u$ are standards, bolted as to their lower ends to the frame A A, and supporting at their upper ends the oblique girt T, which extends from its joint with the lever O downward and forward to the front girt of the main frame. These standards hold the forward end of lever O, or rather the rear end of extension T, some distance above the rear girt of the frame, to allow range of movement of the end or handle O′ in the holder.

J is a cross-bar on the pole, and serves as a neck-yoke. S is a circular plate of iron attached to the pole, as shown in Figs. 1 and 16, and used after the manner of the ordinary circle-iron or fifth-wheel on wagons, to prevent the pole and the parts rigidly joined thereto from tipping over sidewise.

During the operation of my machine, if it be desired to turn it around in a right hand direction, the same may be effected by turning the capstan P so as to incline the pole I to the frame, as shown in Fig. 1, when the forward movement of the horses will turn the machine. To keep it moving in a straight line, it is only necessary that the pole I should be held perpendicularly to the rear girt of the main frame A A. To raise and lower the cutter-bar, the hand of the driver should be applied to the handle of the lifting-lever O to press down the spring $o'$, when the handle may be withdrawn from one socket of the holder $t^4$, and inserted in another above or below it at pleasure, where the spring $o'$, upon being released, will securely hold it.

In order to adapt the moving apron W to the grain-receptacle or binding-platform Y so that the grain may be surely conducted from the former to the latter, I construct the apron, as in the ordinary manner, of strong cloth, $w$, Figs. 2, 3, and 5, but attach the slats or straps $a^2$, for keeping it extended on the under side thereof, in order that at least a portion of its upper surface may be more closely approached by the head or receiving side of the binding-platform than the slats, as heretofore used, running quite across the top of the apron, would permit; otherwise the grain would lodge between the apron and platform or receptacle.

To aid in carrying the grain squarely across the harvester-platform, and to prevent it from turning while being carried or elevated, I attach to the upper side of the apron by rivets (that also pass through the straps $a^2$) the short slats or lugs $a'$, Figs. 1, 2, and 3; or, instead of the slats $a'$, the rivets may secure simply a large washer, $a'''$, as shown in Figs. 4 and 7.

Where the slats or lugs $a'$ are used the binding-platform is provided with fingers $y'$, that, running between the rows of slats and close to the body of the apron, aid in picking up the grain and conducting it upon the binding-platform.

Where simply the washers $a'''$ are used, nearly the full edge of the binding-platform is brought close to the body $w$ of the apron, only openings being left therein through which the washers pass, as shown in Fig. 7.

The apron W runs horizontally across the table over the rolls $b'$, and then is carried up a short distance over the driving-roll or drum on the shaft $l$, journaled in the side pieces or frames $l'$, to deliver over the head of the grain-receptacle or binding-platform, as more particularly shown in Fig. 2.

As heretofore used, the horizontal portion of the apron is held down both at its front and rear sides in the manner the rear portion of the apron herein described is held—that is, by the slat or piece $z$, Figs. 1 and 3, that terminates at the angle of the apron (the point where the elevating portion of the apron commences) with a spring, $z'$, over the outer end of which the apron is drawn as the drum $m$ revolves.

However well this device has worked on the front side of the apron of the actual header, it will not answer to hold down the front side of the horizontal portion of an apron carrying full cut grain across the reaping-platform and afterward elevating it into a binding attachment to be formed into a sheaf, inasmuch as the butts of the grain resting thereon throughout the entire length of the cutter-bar are so far retarded as to deliver the grain heads first upon the binding-platform. To remove this cause of the grain turning, and also to enable the apron to run above the cutter-bar, so as to prevent the grain from riding on the sickle-guards or guard-fingers $h''$, I employ, for the purpose of keeping the apron down, simply the angle-piece $e''$, that has its ends turned up, as shown in Fig. 6, to prevent the apron from catching as it passes under. This angle-piece may be of any rigid material; but I prefer to make it of spring-steel, and it should be secured to the frame-work or finger-bar with the spring part above the apron at that point where it is decided the elevating portion of the apron should commence.

To prevent the grain from running under the spring or angle-piece, I cover it with the wooden block $d'$, that, rising above the spring, carries the grain over it.

The binding-platform or grain-receptacle Y is supported on the extended ends of the beam H, which serves as a finger-bar, and of the cross-bar $x$, Figs. 1 and 8, and the top thereof is made of curvilinear form to receive the grain properly from the elevator. It is slotted, as shown, that the point of the binding-arm may dip beneath on its outward passage.

The binding attachment I have shown in Figs. 1 and 15 supported on a short plank, $n$, resting on the blocks $p'$ and $q'$ on the end $p$ of the front girt of the main frame and the end $q$ of the cross-bar $x$, and consists of a shaft, $g$, that is supported in bearings on the brackets $g'$ $g''$, and to which is rigidly attached the arm $m$, that bears the binding-head $m''$.

The plank and brackets form a frame which overhangs the binding-table from one end, and affords an uninterrupted passage-way, through which the gavel is swept outward to its discharge by the binding-arm.

On the shaft $g$ is a second or compressing arm, $i$, that turns freely thereon, and that, playing in advance of the binding-arm, is secured thereto by a spring, $t'$, that has its ends held by a bolt passing through it firmly against the ears $t''$ of the arms, as shown in Figs. 9, 10, 11, 12, 13, and 15.

Passing through the bracket or standard $g'$, and a short distance below the shaft $g$, is a stud-bolt, $n^4$, more particularly shown in Figs. 15 and 17. On this stud freely turns the outer or reverse compressing-arm, $n'$, which is provided with a segmental gear, $n^3$, that during a portion of each complete passage of the binder-arm meshes into the segmental pinion $m^3$ on the latter, causing arm $n'$ to descend to meet and compress the gavel. Upon this arm $n'$ is also a cam head or surface, $n''$, on the face of which the pin $m^4$ in the binding-arm works to further control the position and movements of the compressing-arm.

On the binding-arm several different kinds of binding-heads, $m''$, whether binding with wire or cord, may be used; but I have herein shown only one, and that binding with wire. It consists simply of a stud-bolt, 6 6'', Figs. 22, 23, 24, and 29, which passes through the end of the binder-arm, and on which turns the twisting-pinion 2 and the rotating part 4 4' 5 5' 8 8' of the wire holder and cutter, and to which is keyed or otherwise firmly secured the fixed part 3 3' of the wire holder and cutter.

The form and position of the parts are as shown in the drawings, and they are shielded by the shield 1 1'', that is riveted to the binding-arm, Figs. 22, 23, and 24. On this shield and making a part thereof are the horn 1' and the ear 1''', to the latter of which is attached an anti-friction roll, 9, Figs. 22, 23, and 30, running upon the stud 9'.

In Fig. 1 $h$ is a sheet-iron shield, fastened to the binding-arm and driving-shaft in such manner as to prevent the binding material from catching on the springs $t'$ or other projecting parts.

Figure 9:
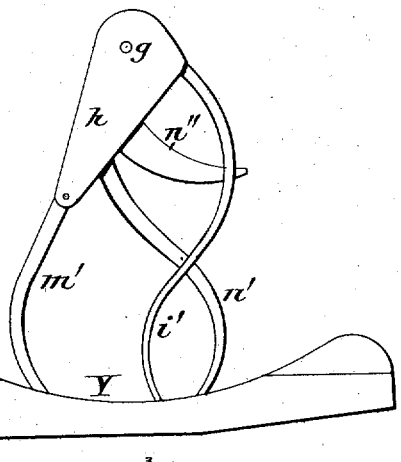
Figure 9:
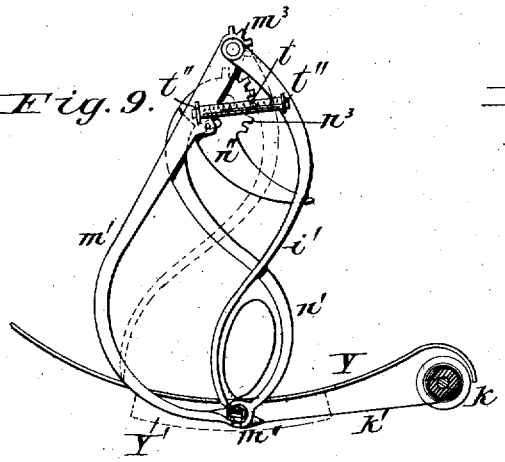
Figure 10:
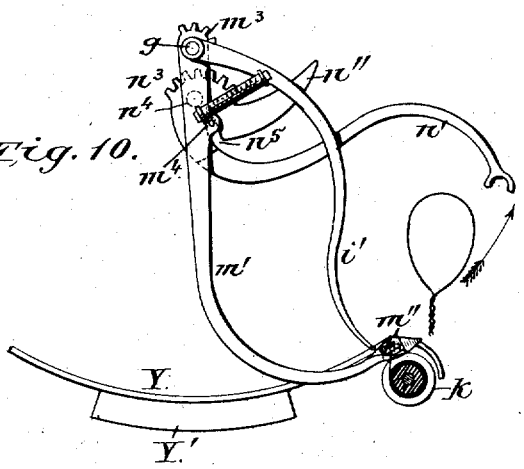

Underneath the grain-receptacle or binding-table and secured in any desired manner thereto is a reel, $k$, Figs. 9 and 10, for carrying the wire, and a rack-box, Y', through which the binding-head passes after the movement of the arm has carried the wire around the binder and as it dips through the slot in the receptacle. This rack-box bears a rack, $s$, as shown in Figs. 35, 36, 37, 38, and 39, that operates the twisting pinion, and a lug, $s'$, that operates the rotating part of the wire-holder and wire-cutter.

The letters $r$, $r'$, $r''$, and $r'''$ refer, respectively, to the left-hand side, right-hand side, bottom, and support of the rack-box. The support in this case is an arm or plank running from the rear of the machine forward underneath the receptacle, and to its inner end the rack-box is firmly secured by fastenings $s''$.

The twisting-pinion may be any ordinary pinion, but should have the teeth cut a little deeper than those of the rack, so as to allow the wire to be inserted between its teeth at any point of its periphery which may be presented without making it liable to come in contact with the rack-teeth, as will be understood from Fig. 40.

The apron W may be operated in any desired manner, as by a sprocket-wheel, $a$, on the crank-shaft, bearing a chain running over the loose sprocket-wheel $b$, that clutches in the sprocket-wheel $c$, keyed or otherwise securely fixed to the shaft or axle $l$ of the driving roll or drum $m$ of the apron, Figs. 1, 7, and 8.

The loose wheel $b$ is clutched in or out of the wheel $c$ at pleasure by means of the lever $d$, Fig. 1.

The binding attachment may also be operated in any desired manner, as by a chain on the sprocket-wheel $c$, driving the sprocket-wheel $e$ on the intermediate shaft $e'$, Fig. 1, that, in turn, by means of the pinion $f$, operates the gear $f'$, attached to the binding-shaft, which, by a complete revolution in one direction, accomplishes the entire operation of binding.

Figure 11:
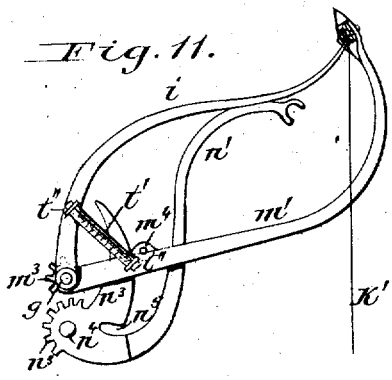
Figure 12:
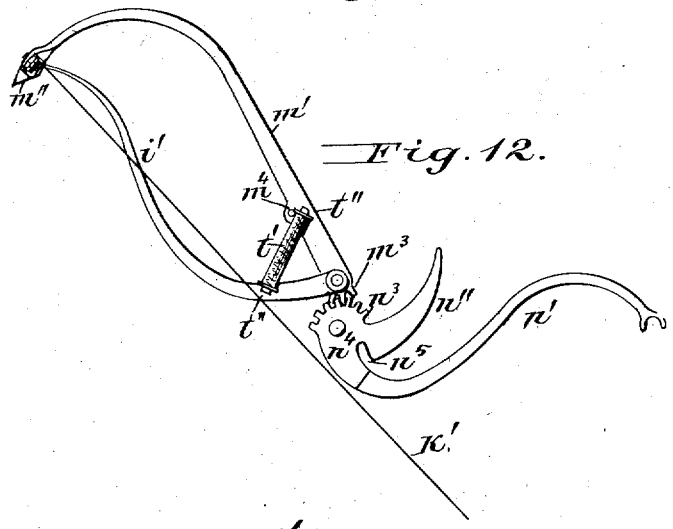

The forward movement of the machine through means of the gear-set D and sprocket-wheels $a$, $b$, and $c$ rapidly revolves the apron W, carrying the cut grain first across the platform in front of the finger-bar and then over the drum $m$, delivering it in a continuous stream upon the concave surface of the grain-receptacle or binding-platform, and against the wire stretching from the binder-arm down through the outer end of the slot in the receptacle, as represented in Fig. 12, when the movement of the binding-arm, actuated by the revolutions of the shaft $g$, causes it to be bound into bundles and cast upon the ground at the side of the machine in the manner following, to wit: The compressing and binding arms being in the position shown by Fig. 10, the end of the binding-wire $k'$, carried on the reel $k$, is secured in the binding-head by inserting it between the fixed and rotating parts of the wire-holder, which is accomplished by placing it in the position shown by the right-hand portion of the dotted line marked 7‴, Fig. 22, when, by revolving the part 4 4′ 5 5′ 8 8′ one-third of a revolution, the end will be drawn between this rotary part and the fixed part of the holder, as shown by 7 in Fig. 22, where it is represented as compressed between that portion marked 5 of the arm 5 5′ of the rotary part of the holder and cutter and the face of the adjacent portion 3′ of the fixed part 3 3′ of said holder and cutter. Then the binding-arm, revolving in the direction indicated by the arrow in Fig. 10, and driving before it the compressing-arm $i'$, acts upon the outer compressing-arm, $n'$, by means of the pin $m^4$ and cam-groove $n^5$, so as to open it away from and increase the space between it and the binding-arm until it is swung so far up as to allow the pin to leave the groove, when it becomes stationary, and remains so while the pin sweeps around the circular face of the cam-head $n''$, as shown in Fig. 11, at which time the position of the wire with reference to the binding-head is as shown by dotted lines 7″, Fig. 22—that is, it has commenced to enter the rear opening, $3^5$, between the portions 3 and 3′ of the stationary part of the holder and cutter.

Figure 13:
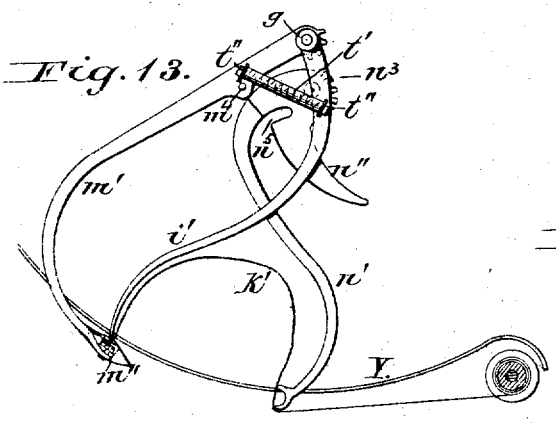

The binding-arm, continuing to revolve and driving the compressing-arm $i'$ as before, soon passes the now stationary arm $n'$, when the teeth of the segmental pinion $m^3$ on the binding-arm, engaging with the teeth of the segmental gear $n^3$ on the arm $n'$, cause the latter arm to be driven down or back over its course again, as shown in Figs. 12 and 13, until the ends of the two arms meet near the front or inside end of the rack-box, at which time the segmental gears have run out of mesh, and the pin $m^4$ has again reached the face of the cam-head $n''$ and enters the cam-groove $n^5$, which is of such shape as to allow the pin to hold the arm $n'$ firmly against the binding-arm $m'$, as shown in Figs. 8 and 9, while the latter drives it back again to the rack-box until the pin reaches the bottom of the cam-groove and acts again on the right-hand face thereof, so swinging up the arm $n'$ until the pin leaves the groove, as before. This operation is repeated for each bundle.

As the binding-arm comes down at the head of the receptacle it pierces through the flowing stream of grain, so as to separate the incoming portion from that which lies upon the receptacle. In its further passage outward across the binding-table or receptacle it gathers and bundles before it the loose grain lying thereon, which by the opposing movement of the vibrating arm $n'$, is compressed against the arm $i'$, moving with the binder-arm.

The spring $t'$ permits the compressing-arms to adjust themselves to the amount of grain between them, compressing whatever quantity may be seized with the full force of the spring, the arm $i'$ yielding, as indicated by dotted lines in Fig. 9, according to the size of the gavel gathered by the binding-arm. While the binding-arm and vibrating compresser-arm are approaching each other, and when slightly in advance of their position shown in Fig. 12, the wire K′, having worked up the inclined face of the horn 1′, swings over its point and enters the rear side of the twisting-pinion and the rear opening, $3^5$, in the fixed part of the holder and cutter, as shown by the left-hand portion of the wire indicated by 7‴ in Figs. 22, 23, 24, and 31. The arms continuing to approach each other, the vibrating arm comes against the strand of wire from the reel, and pushing it in advance loops it around the grain toward the binder-arm, as shown in Fig. 13, until, as the arms come together, it drives it (the wire) into the front side of the twisting-pinion, and between the arms 4 4′ and 5 5′ of the rotary part, and into the mouth $3^4$ of the stationary part of the holder and cutter, when its position is fully shown by 7‴ in Figs. 22, 23, 24, and 31. That this may be accomplished, as the twister and rotary cutter pass out of engagement with the rack and lug one of the spaces between the teeth or arms of each is caused to come into line with the notch or mouth in the disk 3 3′, as shown in Figs. 24 and 29.

As the binder-arm meets the vibrating arm and commences to drive it back the binding-head enters the end of the rack-box and the twisting-pinion meshes in the rack $s$, Fig. 38, causing the pinion to rapidly revolve, and so twist the ends of the wire that is around the grain together, as shown in Fig. 33.

The first movement of the twisting-pinion draws the wire into the circular groove 3‴ in the fixed part of the holder and cutter, as shown in Fig. 32, looping or crimping it over the floor of this groove and underneath the pinion at nearly right angles to those portions of the strand passing between the teeth of the latter, the outer wall of the groove serving to prevent lateral displacement. Then the lug $s'$, striking the arm 5 5′ of the rotary part of the holder and cutter, Fig. 38, revolves the part one-third of a revolution, bringing down the arm 4 4′ to the position previously occupied by 5 5′, as shown in Fig. 39; and so each successive passage of the binding-head through the rack-box causes the movable part of the wire holder and cutter to be rotated one-third of a revolution. As it is rotated by the lug $s'$ it first bends the wire 7‴, Fig. 32, over the cutting-edge 3″, and forcibly seizes it between the face of the part 3′ and the holder 4, when the cutting-edge 4′, following, severs the wire, thus separating from the main body that portion that runs around the bundle and has its ends held from being accidentally withdrawn from the pinion by being looped or crimped under or back of said pinion against the floor of the groove 3‴ of the fixed part aforesaid, and enabling the continued movement of the pinion as the binding-head travels through the remaining portion of the rack-box to twist those ends together, as shown in Fig. 33, thereby completing the process of binding. As the arms again open to the position first assumed, as shown in Fig. 10, the bundle is discharged over the outer or stubble edge of the binding-table and falls upon the ground, and the binding-arm, driven onward by its shaft, rises above the grain-receptacle and passes inward over the accumulating grain thereon to again pierce the inflowing stream on the receiving side and separate a fresh gavel. After the wire 7‴ is severed by the cutting-edges 4′ and 3″, and the end 7⁗ of the wire running to the reel is held, as previously described, between the parts 3′ and 4, this end 7⁗ becomes a new end, that, as the binding-arm revolves, is looped around the new grain on the binding-platform and inserted in the twisting-pinion and united as before, and so the process is carried on continuously.

It should be observed that the recesses 4″, 5″, and 8″ in the rotating part of the holder, as shown in Fig. 25 and elsewhere, aid very much in holding the end of the wire from the reel, as thereby the extreme end remains uncompressed, and so, being larger than that held between the jaws prevents the wire from being withdrawn until released by the movement of the rotating part.

It may also be observed that serrating the face of the parts 4, 5, and 8 after the manner of a sickle, as shown in Figs. 25 and 26, aids somewhat in holding the ends of the wire.

It will be seen that as the binding-head passes through the rack-box the roll 9, working against the flange or side *r*, keeps the pinion in engagement with the rack; that the shield 1 1″ is to protect the parts of the binding-head as it passes through the grain; and that the first teeth in the rack, Figs. 37 and 38, are shortened to prevent the teeth of the pinion catching thereon.

What I claim as my invention is—

1. The combination of a grain-receptacle slotted for the passage of the binder-arm, devices for operating the band-securing mechanism located beneath such receptacle proximately to the slot, and a gaveling and band-carrying arm actuated to pass through the slot from the receiving toward the discharge end of the receptacle, and rise above the latter and the grain thereon in its return movement.

2. In combination with a grain-receptacle upon which the grain is delivered in a continuous stream, a pointed binder-arm actuated to pass through and divide said stream at the receiving end of the receptacle, sweep across the receptacle to the discharge end, gathering and bundling the severed gavel in its journey, and then rise above the receptacle and the inflowing stream upon its return to sever a fresh gavel.

3. The combination of a slotted grain-table or receptacle, upon which the cut grain is received in a free state, and an overhung binder-arm actuated to enter the free grain at the head of the receptacle, move outward, gathering and binding the gavel in its way, discharge the bound sheaf over the outside edge of the receptacle, and then rise above said receptacle on its return to gather a fresh gavel.

4. In combination with a binder-arm moving through and across the grain-receptacle in its outward passage, and rising above the receptacle and the grain thereon in its return movement, an opposing compressing-arm vibrated to and from the binder-arm by the motion of the latter.

5. In combination with a binder-arm moving through and across the grain-receptacle in its outward passage, and rising above the receptacle and the grain thereon in its return movement, a gavel-compressing arm moving with said binder-arm in its orbit.

6. In an automatic binder, the combination, with a binder-arm moving through and across the grain-receptacle in its outward passage, and rising above the receptacle and the grain thereon in its return movement, of two compressing-arms brought into action by the binder-arm, and compressing the gavel between them independently of and slightly in advance of said binder arm.

7. In combination with a binder-arm moving through and across the grain-receptacle in its outward passage, and rising above the receptacle and the grain thereon in its return movement, a pivoted compressor-arm moving with the binder-arm in its path, and a vibrating arm or jaw actuated by the movement of the binder-arm to descend and meet the pivoted arm to compress the gavel between them.

8. In combination with a binder-arm moving through and across the grain-receptacle in its outward passage, and rising above the receptacle and the grain thereon upon its return movement, two opposing compressing arms or jaws acting against each other with a yielding pressure to accommodate themselves to gavels of different size.

9. In combination with a binder-arm moving through and across the grain-receptacle in its outward passage, and rising above the receptacle and the grain thereon upon its return movement, a compressor-arm vibrated positively to and from the binder-arm, and an elastically-yielding compressing arm moving with the binder-arm in its orbit and meeting the vibrating arm at a suitable point to compress the gavel without strain upon the binder arm.

10. In combination with a slotted grain-receptacle and mechanism for delivering the cut grain in a stream thereon, a binder-arm the point of which moves in an orbital path therethrough and thereover, and a reel for supplying wire to the binder-arm, and twisting and holding devices, the arrangement being such that as the binder-arm rises at the outer end of the receptacle in its return movement the wire is stretched from its point through the slot to resist and stop the inflowing grain.

11. The combination of a grain-receptacle, into which the grain is fed, an overhanging frame permitting the passage of the gavel, a binder-arm mounted at the end of said overhanging frame, and a driving-shaft having bearings in said frame, and actuating the binder-arm in its movements over the receptacle to gather and bind the grain thereon.

12. The combination of a grain-receptacle, mechanism delivering grain thereto, a frame overhanging said receptacle from one end, a binder-arm mounted at the end of said overhanging frame, and having an orbital movement as to its point to take it above the receptacle and the grain thereon in its return, and a driving-shaft having bearings in said frame and actuating said binder-arm.

13. The combination of a grain-receptacle, mechanism delivering grain thereto, a bracket-frame overhanging said receptacle from one end, a binder-arm mounted at the end of said overhanging frame, and actuated to move through and across the grain-receptacle and rise above it and the grain thereon in its return movement, an opposing vibrating compressing-arm also mounted at the end of said frame, and a driving-shaft having bearings in the frame and actuating said arms.

14. The combination of a grain-receptacle, mechanism delivering grain thereto, a frame overhanging said receptacle from one end, a binder-arm mounted at the end of said overhanging frame, and having an orbital movement as to its point, a pivoted compressor-arm also mounted at the end of said frame and moving with the binder-arm, an opposing vibrating compressor-arm, likewise mounted at the end of said frame, and a driving-shaft turning in bearings in the frame and actuating the binding and compressing arms.

15. The combination of a binding-arm the point of which moves in an orbital path, an opposing compressing-arm vibrated by the binding-arm in its passage, a cam upon the former, and a pin or rider upon the latter, whereby the two arms, after being brought toward each other, are held relatively fixed as they travel past the twisting-rack, and the compressing-arm then opened away from the binding-arm to permit the bound sheaf to drop.

16. The combination of a binding-arm the point of which moves in an orbital path, a pivoted compressing-arm moving therewith, an opposing compressing-arm vibrated by the binding-arm in its passage, a cam upon the vibrating arm, and a pin or rider upon the binding-arm, whereby, when the arms have been brought together and the gavel compressed, they are held relatively fixed as they travel past the twisting-rack, and the compressing-arm then opened away from the binding-arm to drop the bound sheaf.

17. The combination of a rotary twister, a cutter whereby the wire around the gavel is completely severed from the reel-wire as the twisting operation commences, and a crimping-surface beneath said twister to hold the severed ends of the wire from being withdrawn during the twisting operation.

18. In combination with a rotary twister, a cutter operating to sever the wire and hold the reel end, and a snubbing or holding surface beneath the twister, whereby the wire is first severed and then held from escape while being twisted.

19. In combination with a traveling twister, a cutter traveling therewith and operating to sever the wire around the gavel from the reel-wire, and a crimping or snubbing surface beneath and traveling with the twister, whereby the severed ends of the gavel-wire are bent under and held while being twisted.

20. In combination with a rotary twister and a wire-cutter, a snubbing or crimping plate between the twister and cutter, over which the severed ends of the wire are drawn and crimped by the revolution of the twister.

21. The combination of a rotary twister, a cutter rotating upon the same axis therewith, and a holding-plate between the twister and cutter, against one surface of which the reel end of the wire is clamped by the cutter, and against the other surface of which the gavel ends of the wire are bent by the twister.

22. The combination, with a snubbing and holding disk, of a rotary twister and a rotary cutter placed on either side thereof, and so timed and operated that the wire is first bent over the upper surface of said disk by the twister, then clamped and cut against its lower surface by the cutter, and, finally, the gavel end of the wire completely twisted and united by the continued revolution of the twister.

23. The combination of a rotary twister, driven by engagement of its radial twisting-teeth, a cutter rotating upon the same axis and driven by engagement of its radial cutting-arms, and a notched plate or disk between the twister and cutter, against one surface of which the reel end of the wire is clamped and severed by the cutter, and against the other surface of which the gavel ends of the wire are bent by the twister.

24. The combination of traveling twister, a wire-cutter traveling therewith and rotating upon the same axis, a holding-plate between the cutter and twister, and a rack and lug operating to independently rotate the cutter and twister to cut, hold, and twist the wire.

25. A binding-head slotted for the reception of the wire, and containing upon a single vertical stud, bolt, or axis a rotary twister and a rotary cutter, with a cutting, holding, and snubbing disk between them, in combination with a rackway having a rack and lug which engage independently with the radial twisting-teeth of the twister and the radial cutting-arms of the cutter through an opening in the side of the binding-head.

26. The combination of a rotary twister and a rotary cutter on the same axis, a notched cutting, holding, and snubbing plate or disk between the two, and mechanism by which the twister and cutter are driven, operating to bring spaces between their respective arms into line with a notch in the intermediate plate as they pass out of engagement.

27. The combination, with the main frame of the harvester, of the hinged pole and hinged adjusting-lever, substantially as described.

28. The jointed pole I, capstan P, cable Q, jointed lifting-lever O, and frame A A, the parts being constructed and arranged substantially as described, so as to permit a horizontal and vertical adjustment thereof, as set forth.

29. The plate S, attached to the jointed pole I, and arranged as described with reference to the rear girt, A, of the main frame, so as to prevent the twisting of the pole while permitting a horizontal and vertical adjustment of the parts, substantially as set forth.

30. The arrangement of the apron W, having the extended slats $a^2$ on the under side and the short slats or washers on the upper side thereof, with the fingers $y'$ of the binding-platform $y$, substantially as and for the purpose described.

31. The combination of an elevating-apron, binding-platform, and rotating binding-arm, arranged in relation to each other, substantially as described, so that the continuous stream of grain flowing from the apron upon the binding-platform is separated and gathered into bundles by the binding-arm, substantially as set forth.

32. The combination of the rotating binding-arm $m'$ with the rotating compressing-arm $n'$, substantially as described.

33. The combination of the pin $m^4$ on the arm $m'$ with the cam-head $n''$ on the arm $n'$, whereby the binding-arms are held together while the band is secured, and afterward opened to allow the bundle to be discharged, substantially as described.

34. The combination of the rotating binding-arm, having thereon the segmental pinion $m^5$, with the vibrating compressing-arm, having thereon the segmental gear $n^3$, as and for the purpose set forth.

35. The combination of the rotating binding-arm $m'$, having thereon the segmental pinion $m^3$ and pin $m^4$, with the vibrating arm $n'$, having thereon the segmental gear $n^3$ and cam-head $n''$, substantially as and for the purpose described.

36. The combination of a rotary compressing-arm, $i'$, with a vibrating arm, $n'$, whereby the loose grain is gathered and compressed ready for the binding material, substantially as described.

37. The twisting-pinion 2, mounted on a central bearing-post, and driven by engagement of its radial twisting-teeth, in combination with mechanism for presenting the wire to said teeth on opposite sides of the pinion.

38. A rotary wire-cutter having radial cutting-arms, constructed with a bevel in advance of the cutting-shoulder, whereby the wire is clamped before it is cut.

39. A rotary wire-cutter having radial cutting-arms, constructed with a bevel in advance of the cutting-shoulder to clamp the wire before it is cut, in combination with mechanism engaging said arms to rotate the cutter.

40. The rotary part of the wire holder and cutter having radial cutting-arms, constructed with a bevel in advance of the cutting-shoulder and a groove between the bevel and shoulder.

41. The fixed part of the wire holder and cutter, provided with cutting-edge $3''$, holding-face $3'$, openings $3^4$ and $3^5$, for receiving the ends of the band around the bundle, and the groove $3'''$, substantially as and for the purpose described.

42. The combination of the twisting-pinion 2 with the circular groove $3'''$ in the fixed part of the wire holder and cutter, whereby the ends of the binding-wire are held in the twisting-pinion until the same are twisted together, substantially as described.

43. A rotary wire-holder having radial cutting-arms, constructed with a bevel in advance of the cutting-shoulder, in combination with a notched plate or disk, against which the wire is first clamped by the bevel and then cut by the shoulder.

44. In combination with a rotary twister, a cutter rotating upon the same axis therewith and formed with radial cutting-arms, which are beveled in advance of the cutting-shoulder, and a notched plate or disk between said twister and cutter, against one surface of which the wire is clamped by the bevel and then cut by the shoulder, and against the other surface of which the ends of the gavel portion are bent or snubbed by the twister.

45. The horn $1'$ on the rotating arm $m'$, arranged with reference to pinion 2, as set forth, whereby the binding-wire is inserted and held in the rear teeth of the pinion, substantially as described.

46. The shield $h$ on the rotating binding-arm for guiding the wire over the projecting portions of the binding-arms, substantially as described.

47. In combination with the traveling binding-head, the rack-box $Y'$, provided with the lug $s'$, rack $s$, and opposite flange $r$, for holding the binding-head in the rack and against the lug, substantially as described.

48. The combination of the anti-friction roll 9 upon the binding-head, and the flange $r$ of the rack-box $Y'$, whereby the twisting, holding, and cutting mechanisms are held in proper position as they pass through the rack-box, substantially as described.

49. The combination of a slotted grain-receptacle, a rack way or box beneath raid receptacle, parallel with and proximately to the slot, and a subtending arm or bracket running from the rear of the machine forward beneath the receptacle, to support the rack.

50. The shield 1, attached to the arm $m'$, to shield the various parts of the binding-head as it passes through the stream of flowing grain coming from the apron, substantially as described.

SYLVANUS D. LOCKE.

Witnesses:
WM. M. ARCHIBALE,
WM. H. ELY.